United States Patent [19]

Trivette, Jr.

[11] 4,434,266
[45] Feb. 28, 1984

[54] METHOD FOR RUBBER TREATMENT AND THE RUBBER THUS TREATED

[75] Inventor: Chester D. Trivette, Jr., Akron, Ohio

[73] Assignee: Monsanto Company, St. Louis, Mo.

[21] Appl. No.: 424,733

[22] Filed: Sep. 23, 1982

[51] Int. Cl.$^3$ .......................... C08L 7/00; C08L 9/00; C08L 13/00

[52] U.S. Cl. .................................... 524/425; 524/445; 524/451; 524/533; 525/301

[58] Field of Search ................ 525/301; 524/529, 533, 524/425, 445, 451

[56] References Cited

U.S. PATENT DOCUMENTS 2,388,905 11/1945 Compagnon et al. .
4,254,013 3/1981 Friedman et al. .................. 525/218

OTHER PUBLICATIONS

Chemical Abstracts Reference: 85:95546z, High-Viscosity Rubber Latexes, Hirai, Koji; Okamura, Takayuki; Fujii, Kiyoshi (Kuraray Co., Ltd.) Japan.

*Primary Examiner*—Allan Lieberman
*Attorney, Agent, or Firm*—Gordon B. Seward

[57] ABSTRACT

Diene rubber is treated with a maleic acid half ester, optionally in the presence of sulfur or an organic sulfur compound capable of generating a thiyl radical at an appropriate temperature (above 130° C.) for a time sufficient to increase the green strength or tack of the diene rubber, but insufficient to decrease its tack. The treated diene rubber exhibits improved fabricability in the production of rubber products.

25 Claims, No Drawings

METHOD FOR RUBBER TREATMENT AND THE RUBBER THUS TREATED

BACKGROUND OF THE INVENTION

This invention relates to a method for treating diene rubber with a maleic acid half ester, optionally with sulfur or an organic sulfur compound capable of generating a thiyl radical. The method is effective in improving the tack, green strength or both of the diene rubber.

The introduction of synthetic diene rubber as a total or partial replacement for natural rubber in portions of pneumatic tires and other rubber articles presented problems in that the behavior of the synthetic materials differed from that of natural rubber. One significant area of difference concerned tack and green strength. Typically, unvulcanized synthetic diene rubber has significantly lower green strength and tack properties than does natural rubber. This difference has presented problems in that articles such as tires failed to maintain their structural integrity during handling and shaping prior to vulcanization. As a result, searching for improvements in the green strength and tack of rubber compounds containing synthetic rubber has been a continuing effort.

Synthetic polyisoprene has been produced which resembles natural rubber closely, consisting of essentially all cis-1,4-polyisoprene. Perhaps the most significant difference between synthetic polyisoprene and natural rubber is that the former has considerably less green strength and tack. Thus, much of the effort toward green strength and tack improvement concerns synthetic polyisoprene. Other synthetic diene rubbers which are widely used are polybutadiene and styrene/butadiene copolymer rubber (SBR).

Efforts to increase the tack and green strength of diene rubber include a variety of treatments such as the addition of a wide variety of resin tackifiers to synthetic rubber compounds. In general, these materials have been ineffective for the desired purpose, primarily because of the inherently lower green strength of the synthetic rubber polymers. U.S. Pat. Nos. 3,151,161 and 3,225,100 teach incorporation of nitrosoanilinoalkanes into rubber, and improvements in green strength have been realized in synthetic rubber thus treated. Problems of dispersion of these materials into rubber have been encountered, compounded by the fact that relatively small amounts are generally used.

SUMMARY OF THE INVENTION

It is an object of this invention to provide a method of treating diene rubber so as to increase its green strength, tack or both. It is another object to provide a diene rubber composition by this method which has increased tack or green strength or both.

These and other objects are realized in the instant invention by a method of improving the properties of diene rubber comprising treating diene rubber, optionally in the presence of a modification promoting amount of (A) sulfur or an organic sulfur compound capable of generating thiyl radicals, with (B) a maleic acid half ester at an appropriate temperature above 130° C. for a time sufficient to increase the green strength or tack of the diene rubber, but insufficient to decrease its tack.

Further, the invention includes the product of the above method.

Component (B) of the invention is a maleic acid half ester. Preferably a "maleic acid half ester" is a compound which is a product of the reaction of one mole of a mono- or polyhydric alcohol of the formula R $(OH)_n$ with n moles or less of maleic acid or anhydride, where R is alkyl or alkenyl of 1–20 carbon atoms, cycloalkyl of 3–20 carbon atoms, aryl of 6–20 carbon atoms, or aralkyl or alkaryl of 7–20 carbon atoms, optionally substituted with one or more non-reactive substituents selected from halogen, nitro and alkoxy or carboxy of 1–5 carbon atoms.

Examples of R $(OH)_n$ wherein n is one include monohydric alcohols such as methanol, ethanol, n-propanol, isopropanol, n-butanol, sec-butanol, tert-butanol, isobutanol, n-amyl alcohol, cyclohexanol, n-octyl alcohol, n-decyl alcohol, myristyl alcohol, cetyl alcohol, stearyl alcohol, benzyl alcohol, phenol, cresol, phlorol, xylenol, p-ethylphenol, p-methylphenol, naphthol, phenanthrol, allyl alcohol, methylisobutylcarbinol, triphenylcarbinol, methylvinylcarbinol and 3-chloro-1-propanol.

Dihydric alcohols within the above definition include ethylene glycol, propylene glycol, catechol, resorcinol, hydroquinone, neopentyl glycol, 2,2,4-trimethyl-1,3-pentanediol; 1,4-cyclohexanedimethanol, 1,4-butylene glycol and 1,3-butylene glycol.

Trihydric alcohols within the above definition include glycerol, pyrogallol and phloroglucinol.

Tetrahydric alcohols include pentaerythritol.

Component (A) of the invention is defined as sulfur or an organic sulfur compound capable of generating a thiyl radical. The sulfur compound is preferably a polymeric sulfide or a compound of the formula $(R_1S_x)_yR_2$, wherein x is an integer of 1–5, y is an integer of from 1–4, $R_2$ is a radical selected from aliphatic hydrocarbon radicals of 3–18 carbon atoms optionally containing one or more ether or ester linkages and optionally substituted by one or more nitro, amino or carboxyl groups; cycloalkyl of 3–10 carbon atoms; benzyl or phenyl optionally ring-substituted by one or more nitro, amino, carboxyl, or 1–5 carbon-atom alkyl groups; or benzothiazyl; dialkylthiocarbamoyl; alkylamino of 4–12 carbon atoms; morpholino or dialkylthiophosphoroyl; $R_2$ having a valence of y; and $R_1$ is hydrogen or a radical selected from the same group as $R_2$.

Such sulfur compounds include, for example, thiokol polymers and phenyl disulfide, 4,4'-diaminophenyldisulfide, 4,4'-dinitrophenyldisulfide, 2,2'-diaminophenyldisulfide, 4,4'-dicarboxyphenyldisulfide, cyclohexyldisulfide, benzyldisulfide, the compound n—$C_8H_{17}$—$S_x$—$C_8H_{17}$—n, where x is an average of 3.5; N,N'-dimorpholinodisulfide, N-t-butyl-2-benzothiazyl sulfenamide, tetramethyl thiuram disulfide; mercaptans, such as n-decyl mercaptan, n-dodecyl mercaptan, phenyl mercaptan and 2-mercaptobenzothiazole; and compounds of the formula Acc-SS-R-SS-Acc, where Acc stands for an accelerator moiety such as benzothiazyl, dialkyldithiocarbamoyl, and the like, and R is a divalent hydrocarbon radical such as alkylene, p-phenylene, p-xylene and the like.

Examples of this latter variety of compounds are

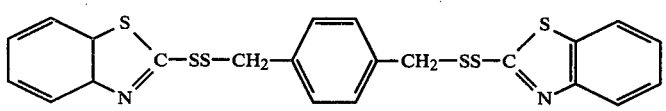

and

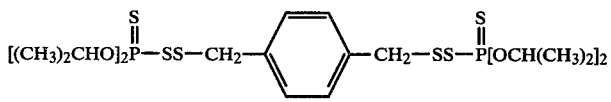

A preferred embodiment of (A) within the general formula is 2,2'-dithiobisbenzothiazole, sometimes known as benzothiazyldisulfide, or MBTS.

If sulfur is used as component (A) it can generally be used in lesser amounts than the organic sulfur compounds. The use of too much sulfur may actually reduce tack since, with excessive amounts of sulfur, appreciable vulcanization may occur during the treatment.

By diene rubber is meant an elastomer which is a polymer from diene monomer, either a natural or synthetic polymer, including mixtures of two or more of natural and synthetic polymers. Natural diene rubber includes hevea rubber, in the form of smoked sheet, crepe or other typical forms, guayule, and other naturally occurring elastomers. Synthetic polymers which are included in the definition of "diene rubber" include polymers from isoprene and butadiene, either homopolymers or copolymers with one or more co-monomers, which can be dienes or other copolymerizable materials. For example, co-polymers of isoprene or butadiene with styrene, acrylonitrile, isobutylene, or unsaturated carboxy acids and esters such as maleic, fumaric, itaconic, acrylic and methacrylic acids, and methylmethacrylate are included. EPDM rubbers (polymers from ethylene, propylene and a non-conjugated diene monomer) are also included.

The invention finds a particular utility in use with synthetic polyisoprene of a high cis-1,4 content, and with blends thereof with polybutadiene or SBR (styrene/butadiene copolymer rubber).

Component (A), if present, is to be used in reaction promoting amount. This amount can vary, depending on the diene rubber, the particular component (B) employed, the improvement desired and, especially, the nature of the particular component (A) used. In general, the amount is preferably from 0.01 to 15 parts, more preferably from 0.02 to 4 parts and most preferably from 0.05 to 2.5 parts by weight of component (A) per 100 parts by weight of diene rubber. If (A) is sulfur, less than 0.25 parts per 100 parts of treated rubber is preferred.

Component (B) can similarly be present in varying amount, but is preferably used at level of from 0.1 to 20 parts, more preferably from 0.2 to 8 parts and most preferably from 0.25 to 5 parts by weight per 100 parts by weight of diene rubber. The use of amounts of component (B) which are less than the preferred lower limits can result in insufficient improvement in the desired properties of the diene rubber. Also, the use of amounts of the components in excess of the preferred upper limits can be counterproductive. Optimum levels can be easily determined by a few simple experiments.

Treatment of the diene rubber means incorporating component (B) and, optionally, (A) into the rubber, with good dispersion, and maintaining the mixture at the appropriate temperature above 130° C. for sufficient time to permit the modification to occur. Preferably, the temperature should be at least 150° C., more preferably at least 160° C. and most preferably from 160° to 210° C. A convenient method of treating involves admixture of the treatment materials into the rubber using the type of high-shear equipment normally used for mixing rubber compounds, such as rubber mills, and, preferably, internal mixers exemplified by Banbury mixers and the like. Such mixing produces a temperature rise in the rubber mixture which can be controlled within the desired temperature range. Alternatively, components (A) and (B) can be incorporated into the diene rubber at a relatively low temperature (below 130° C.) and then the mixture can be heated to the appropriate higher temperature and held for the required time.

Preferably, the treatment time will be from 0.1 to 20 minutes, more preferably from 0.5 to 15 minutes and most preferably from 1 to 10 minutes. Shorter treatment times than the preferred minimum can result in insufficient improvement in the desired properties, and longer treatment times than the preferred maximum can be harmful to the rubber. It is preferred that the treatment time employed will result in increasing the tack of the rubber as well as the green strength. As with the levels of the components, both optimum times and optimum temperatures for a specific combination of ingredients can easily be determined by a limited number of experiments.

Other rubber compounding ingredients can optionally be present during the treatment, and the presence of carbon black and/or non-black fillers is preferred. Because of the conditions employed, however, the complete vulcanization system is preferably not present during the treatment, as it could result in a premature curing, or scorch, of the diene rubber compound. If it is desired to have non-black fillers present in the diene rubber compound, particular advantage is realized by having the fillers present during the treatment step. This method can produce interaction between the non-black filler and the diene rubber so as to obtain better physical properties in the vulcanized compounds. These better physical properties are evidenced in improvements in stress-strain properties among other properties.

Preferably, the presence of amines such as antidegradants during the treatment step should be avoided lest they react with component (B) before it can react with the rubber polymer. Such compounding ingredients and others which can react adversely with component (B) should be added after the treatment either as a separate step or simply added after sufficient reaction time has elapsed.

Often, when treating the diene rubber, amounts of component (B) and, optionally, (A) will be substantially less than the maximum preferred levels set forth above, such as, for example, less than three parts by weight per 100 parts of diene rubber by weight, but higher amounts can be employed, especially if a "masterbatch" technique is used. This technique can involve treating only a portion of the diene rubber, then subsequently blending the untreated portion into the treated portion. From ten parts or less up to 1,000 parts or more additional rubber can be admixed to the treated rubber, as desired. The additional rubber can be the same as, or different from the rubber originally treated. The masterbatch technique can be effective in providing more efficient use of the masticating equipment, thus allowing higher throughput of rubber.

During the treatment step, the appropriate amounts of component (B), and (A), if desired, are present in the diene rubber. If both components are used they can be added separately, or both components can be added together as a mixture.

As mentioned above, increasing the tack and green strength of diene rubber is of great practical importance. The nature of these two properties in uncured rubber compounds has been explored by a number of investigators. A review of recent developments was recently published, written by G. R. Hamed of the University of Akron, entitled "Tack and Green Strength of Elastomeric Materials", *Rubber Chemistry and Technology*, 54, pp. 576–595 (1981). This review brings out the basic fact that tack and green strength are interrelated. Tack has been defined as the ability of two materials to resist separation after bringing their surfaces into contact for a short time under a light pressure. Green strength in an elastomer is its resistance, before vulcanization, to deformation or fracture. Green Strength can be determined independently, but tack is dependent to a certain degree on green strength.

DETAILED DESCRIPTION

A more complete understanding of the invention may be realized by reference to the following examples, in which all parts are by weight, unless otherwise specified.

Component (B), and, optionally (A) are admixed to diene rubber and the compounds thus formed are tested, in the uncured state, for tack and green strength.

Green strength measurements are performed using a standard tensile testing machine. Samples of the stock to be tested are pressed into slabs approximately three millimeters in thickness, from which slab specimens are die-cut measuring about 20.3×2.4 cm. The specimens are bench marked (to a test length of 2.54 cm.) in the center, and the exact width and thickness is measured. Specimens are pulled at a crosshead speed of 50.8 cm. per minute, with the stress recorded at desired levels of elongation up to 1200%, or break. Stress values are calculated based on the original cross-section area of each specimen, and the maximum stress value is also recorded.

Tack measurements are made using the Monsanto Tel-Tak instrument, as described in an article by J. R. Beatty in *Rubber Chemistry and Technology*, 42, 1040 (1969). Fabric-backed rubber specimens are cut to a width of 6.35 mm and placed at right angles to give a contact area of 0.403 $cm^2$. A contact pressure of 227 grams is used for all tests, with a 30-second dwell time. Sample "stickiness" is measured by substituting a polished stainless stell surface for one specimen, and the result is subtracted from the tack value to give a "true tack" measurement. The units of these measurements are in grams per square centimeter, representing the maximum force per unit area required to separate the specimens, at a separation rate of 2.54 cm. per minute.

Stress-strain properties of the vulcanizates are measured in the conventional manner.

In all of the following examples, the masterbatch is mixed in a laboratory Banbury mixer according to the following schedule:

1. Charge rubber and test compounds; mix 1 minute, controlling temperature between 150° and 154° C.
2. Charge ½ of carbon black; mix 1 minute.
3. Charge oil and remainder of carbon black; mix 1 minute.
4. Charge remaining ingredients; mix 1 minute.
5. Sweep down; mix 1 minute.
6. Dump. Actual rubber temperature (using probe) should be 170°–200° C.

If sulfur and accelerator are included, they are then admixed on a laboratory mill.

EXAMPLE I

To evaluate the effect of maleic acid half esters on synthetic polyisoprene, with and without sulfur, a series of masterbatches is mixed using the mixing sequence set forth above. A control with no additive is included as well as a masterbatch containing a known treating agent, N-(2-methyl-2-nitropropyl)-4-nitrosoaniline, at 33% on a clay carrier, sold under the trademark NITROL ®, and used at its recommended level. Another masterbatch has sulfur only.

The masterbatches are mixed as indicated and tested for green strength and tack. The formulations and test results are set forth in Table I. The test results show the effectiveness of the maleic acid half esters, either with or without sulfur, in improving both the green strength and tack of polyisoprene. Sulfur alone gives an increase in green strength, but reduces the tack substantially.

TABLE I

|  | MASTERBATCH | | | | | | | | |
| --- | --- | --- | --- | --- | --- | --- | --- | --- | --- |
|  | A | B | C | D | E | F | G | H | I |
| Polymer | | | | | | | | | |
| NATSYN 2200 | 100.0 | → | → | → | → | → | → | → | → |
| Test Compounds | | | | | | | | | |
| NITROL ® | — | 0.75 | — | — | — | — | — | — | — |
| Glyceryl trimaleate | — | — | 1.0 | 1.0 | 2.0 | — | — | — | — |
| Ethylene dimaleate | — | — | — | — | — | 1.0 | 1.0 | 2.0 | — |
| Sulfur | — | — | — | 0.1 | — | — | 0.1 | — | 0.1 |
| Other Ingredients | | | | | | | | | |
| N-330 Carbon Black | 50.0 | → | → | → | → | → | → | → | → |
| Circosol 4240 Oil | 5.0 | → | → | → | → | → | → | → | → |
| Zinc Oxide | 5.0 | → | → | → | → | → | → | → | → |
| Stearic Acid | 2.0 | → | → | → | → | → | → | → | → |
| Santoflex 13 | 2.0 | → | → | → | → | → | → | → | → |

TABLE I-continued

| | MASTERBATCH | | | | | | | | |
|---|---|---|---|---|---|---|---|---|---|
| | A | B | C | D | E | F | G | H | I |
| Green Strength @ Room Temp, MPa | | | | | | | | | |
| Stress at: | | | | | | | | | |
| 100% | 0.32 | 0.30 | 0.32 | 0.34 | 0.41 | 0.33 | 0.34 | 0.31 | 0.37 |
| 300% | 0.23 | 0.45 | 0.34 | 0.70 | 0.77 | 0.59 | 0.34 | 0.42 | 0.50 |
| 400% | 0.23 | 0.62 | 0.40 | 1.03 | 1.12 | 0.85 | 0.35 | 0.52 | 0.68 |
| U.E., % | >1200 | 570 | 720 | 490 | 490 | 520 | 790 | 620 | 600 |
| Tack, Monsanto Tel-Tak | | | | | | | | | |
| Tack | 48 | 86 | 68 | 98 | 101 | 88 | 56 | 86 | 43 |
| Stickiness | 13 | 15 | 13 | 15 | 15 | 23 | 18 | 17 | 17 |
| "True" Tack | 35 | 71 | 55 | 83 | 86 | 65 | 38 | 69 | 26 |

EXAMPLE II

The masterbatches treated in Example I are further compounded with sulfur and an accelerator, N-oxydiethylene-2-benzothiozole sulfenamide. The fully compounded stocks are tested as before.

All the green strength and tack values are lower for the fully compounded stocks, but the reductions appear proportional, and the same relative rating of the effectiveness of the treatment is observed.

TABLE II

| | STOCKS | | | | | | | | |
|---|---|---|---|---|---|---|---|---|---|
| | 1 | 2 | 3 | 4 | 5 | 6 | 7 | 8 | 9 |
| Masterbatch | | | | | | | | | |
| A | 164.0 | — | — | — | — | — | — | — | — |
| B | — | 164.75 | — | — | — | — | — | — | — |
| C | — | — | 165.0 | — | — | — | — | — | — |
| D | — | — | — | 165.1 | — | — | — | — | — |
| E | — | — | — | — | 166.0 | — | — | — | — |
| F | — | — | — | — | — | 165.0 | — | — | — |
| G | — | — | — | — | — | — | 165.1 | — | — |
| H | — | — | — | — | — | — | — | 166.0 | — |
| I | — | — | — | — | — | — | — | — | 164.1 |
| Sulfur | 2.5 | → | → | → | → | → | → | → | → |
| Accelerator | 0.5 | → | → | → | → | → | → | → | → |
| Green Strength @ Room Temp., MPa | | | | | | | | | |
| Stress at: | | | | | | | | | |
| 100% | 0.23 | 0.26 | 0.28 | 0.30 | 0.37 | 0.28 | 0.29 | 0.32 | 0.24 |
| 300% | 0.14 | 0.31 | 0.23 | 0.47 | 0.44 | 0.24 | 0.36 | 0.31 | 0.23 |
| 400% | 0.13 | 0.40 | 0.27 | 0.69 | 0.62 | 0.27 | 0.48 | 0.39 | 0.27 |
| U.E., % | >1200 | 640 | 860 | 560 | 630 | 920 | 610 | 790 | 900 |
| Tack, Monsanto Tel-Tack | | | | | | | | | |
| Tack | 44 | 60 | 57 | 86 | 97 | 54 | 78 | 76 | 44 |
| Stickiness | 16 | 21 | 14 | 16 | 14 | 14 | 16 | 18 | 18 |
| "True" Tack | 28 | 39 | 43 | 70 | 83 | 40 | 62 | 58 | 26 |

EXAMPLE III

Ethanol and n-butanol half esters of maleic acid are evaluated in a similar manner as in Example I, except that 2,2'-dithiobisbenzothiazole is used as component (A). The formulations and results are set forth in Table III. The ethanol half ester together with MBTS gives much better results than the n-butanol half ester by itself.

TABLE III

| | Masterbatch | | | |
|---|---|---|---|---|
| | J | K | L | M |
| Polymer | | | | |
| Natsyn 2200 | 100.0 | → | → | → |
| Test Compounds | | | | |
| NITROL ® | — | 0.75 | — | — |
| n-Butanol Maleic half ester | — | — | 1.0 | — |
| Ethanol Maleic half ester | — | — | — | 1.0 |
| MBTS | — | — | — | 0.5 |
| Other Ingredients | | | | |
| N-330 Carbon Black | 50.0 | → | → | → |
| Circosol 4240 Oil | 5.0 | → | → | → |
| Zinc Oxide | 5.0 | → | → | → |
| Stearic Acid | 2.0 | → | → | → |
| Antidegradant | 2.0 | → | → | → |
| Batch Dump Temp., °C. (Probe) | 188 | 183 | 185 | 193 |
| Green Strength at Room Temp., MPa | | | | |
| Stress at: | | | | |
| 100% | 0.26 | 0.31 | 0.24 | 0.33 |
| 300% | 0.19 | 0.40 | 0.17 | 0.74 |
| 400% | 0.18 | 0.54 | 0.17 | 1.24 |
| U.E., % | 1200 | 620 | 1200 | 490 |
| Tack, Monsanto Tel-Tak | | | | |
| Tack | 44 | 66 | 43 | 109 |
| Stickiness | 11 | 12 | 12 | 13 |
| "True" Tack | 33 | 54 | 31 | 96 |

EXAMPLE IV

Ethylene dimaleate, glyceryl trimaleate and the n-butanol and ethanol half ester of maleic acid are compared for their effect on synthetic polyisoprene, both with and without MBTS as a coagent. Samples are prepared and tested as in Example I, and the data and results are set forth in Table IV. The results show that glyceryl trimaleate is the most effective of the compounds tested followed by ethylene diamaleate. All of the half esters gave better results when combined with MBTS, with the exception of the n-butanol half ester. MBTS by itself was ineffective at the level employed.

With the 50/50 natural/BR stocks the green strength is increasingly better with higher levels of glyceryl

TABLE IV

|  | Masterbatch | | | | | | | | | |
|---|---|---|---|---|---|---|---|---|---|---|
|  | N | O | P | Q | R | S | T | U | V | W |
| Polymer | | | | | | | | | | |
| Natsyn 2200 | 100.0 | → | → | → | → | → | → | → | → | → |
| Test Compounds | | | | | | | | | | |
| Ethylene Dimaleate | — | — | 1.0 | 0.85 | — | — | — | — | — | — |
| Glyceryl Trimaleate | — | — | — | — | 1.0 | 0.85 | — | — | — | — |
| n-Butanol Maleic half ester | — | — | — | — | — | — | 1.0 | 0.85 | — | — |
| Ethanol Maleic half ester | — | — | — | — | — | — | — | — | 1.0 | 0.85 |
| MBTS | — | 0.15 | — | 0.15 | — | 0.15 | — | 0.15 | — | 0.15 |
| Other Ingredients | | | | | | | | | | |
| N-330 Carbon Black | 50.0 | → | → | → | → | → | → | → | → | → |
| Circosol 4240 Oil | 5.0 | → | → | → | → | → | → | → | → | → |
| Zinc Oxide | 5.0 | → | → | → | → | → | → | → | → | → |
| Stearic Acid | 2.0 | → | → | → | → | → | → | → | → | → |
| Antidegradant | 2.0 | → | → | → | → | → | → | → | → | → |
| Batch Dump Temp., °C. (Probe) | 187 | 187 | 189 | 191 | 189 | 184 | 181 | 186 | 188 | 190 |
| Green Strength at Room Temp., MPa Stress at: | | | | | | | | | | |
| 100% | 0.28 | 0.26 | 0.33 | 0.30 | 0.36 | 0.32 | 0.29 | 0.26 | 0.30 | 0.28 |
| 300% | 0.19 | 0.18 | 0.31 | 0.26 | 0.35 | 0.38 | 0.21 | 0.19 | 0.24 | 0.25 |
| 400% | 0.18 | 0.17 | 0.37 | 0.30 | 0.43 | 0.53 | 0.21 | 0.19 | 0.24 | 0.27 |
| U.E., % | >1200 | >1200 | 760 | 790 | 690 | 620 | 970 | 1080 | 1070 | 840 |
| Tack, Monsanto Tel-Tak | | | | | | | | | | |
| Tack | 49 | 48 | 66 | 57 | 71 | 71 | 52 | 47 | 50 | 50 |
| Stickiness | 22 | 18 | 22 | 20 | 18 | 18 | 24 | 19 | 22 | 20 |
| "True" Tack | 27 | 30 | 44 | 37 | 53 | 53 | 28 | 28 | 28 | 30 |

EXAMPLE V

Glyceryl trimaleate is incorporated into natural rubber and into a 50/50 blend of natural rubber and cis-4-polybutadiene to observe its effect, both with and without MBTs. Samples are prepared and tested as in Example I, and the data and results are set forth in Table V. The results show that even the relatively high green strength and tack of the natural rubber stocks are improved by treatment with glyceryl trimaleate. MBTS as a coagent gives improved results in all instances.

trimaleate. Again, MBTS is effective as a coagent. Tack values improved over the control, but a definite trend is difficult to determine.

TABLE V

|  | Masterbatch | | | | | | | | | |
|---|---|---|---|---|---|---|---|---|---|---|
|  | X | Y | Z | AA | AB | AC | AD | AE | AF | AG |
| Polymer | | | | | | | | | | |
| Natural Rubber, SMR 5-CV | 100.0 | → | → | → | → | 50.0 | → | → | → | → |
| Butadiene Rubber, Cis-4-1203 | — | — | — | — | — | 50.0 | → | → | → | → |
| Test Compounds | | | | | | | | | | |
| Glycerol Trimaleate | — | 1.0 | 0.85 | 1.5 | 1.0 | — | 0.85 | 1.0 | 1.5 | 1.0 |
| MBTS | — | 0.5 | 0.15 | — | — | — | 0.15 | 0.5 | — | — |
| Other Ingredients | | | | | | | | | | |
| N-330 Carbon Black | 50.0 | → | → | → | → | → | → | → | → | → |
| Circosol 4240 Oil | 5.0 | → | → | → | → | → | → | → | → | → |
| Zinc Oxide | 5.0 | → | → | → | → | → | → | → | → | → |
| Stearic Acid | 2.0 | → | → | → | → | → | → | → | → | → |
| Antidegradant | 2.0 | → | → | → | → | → | → | → | → | → |
| Batch Dump Temp., °C. (Probe) | 189 | 190 | 187 | 185 | 187 | 195 | 192 | 191 | 191 | 193 |
| Green Strength at Room Temp., MPa Stress at: | | | | | | | | | | |
| 100% | 0.41 | 0.41 | 0.43 | 0.43 | 0.42 | 0.32 | 0.32 | 0.37 | 0.34 | 0.32 |
| 300% | 0.85 | 1.21 | 1.02 | 1.00 | 0.99 | 0.31 | 0.38 | 0.50 | 0.34 | 0.32 |
| 400% | 1.45 | — | 1.60 | 1.62 | 1.65 | 0.35 | 0.45 | 0.66 | 0.40 | 0.37 |
| U.E., % | 450 | 390 | 402 | 400 | 390 | 740 | 660 | 570 | 715 | 720 |
| Tack, Monsanto Tel-Tak | | | | | | | | | | |
| Tack | 64 | 55 | 62 | 64 | 66 | 37 | 22 | 23 | 32 | 24 |
| Stickiness | 16 | 16 | 16 | 15 | 16 | 16 | 14 | 14 | 13 | 13 |
| "True" Tack | 18 | 39 | 46 | 49 | 50 | 21 | 8 | 9 | 19 | 11 |

EXAMPLE VI

Glyceryl trimaleate is again investigated, this time in SBR and 50/50 SBR/NR rubber stocks. The SBR polymer used is SBR 1502, a cold-polymerized copolymer of butadiene and styrene in a ratio of about 76% butadiene and 24% styrene. As before, increasing levels of glyceryl trimaleate give increasing green strength and tack, with an improvement shown by incorporating MBTS as a coagent.

TABLE VI

| | Masterbatch | | | | | | | | | |
|---|---|---|---|---|---|---|---|---|---|---|
| | AH | AI | AJ | AK | AL | AM | AN | AO | AP | AQ |
| Polymer | | | | | | | | | | |
| Natural Rubber, SMR 5-CV | 50.0 | → | → | → | → | — | — | — | — | — |
| SBR 1502 | 50.0 | → | → | → | → | 100.0 | → | → | → | → |
| Test Compounds | | | | | | | | | | |
| Glyceryl Trimaleate | — | 1.27 | 1.70 | 2.0 | 1.70 | — | 1.70 | 2.55 | 2.0 | 1.70 |
| MBTS | — | 0.23 | 0.30 | — | — | — | 0.30 | 0.45 | — | — |
| Other Ingredients | | | | | | | | | | |
| N-660 Carbon Black | 60.0 | → | → | → | → | → | → | → | → | → |
| Circosol 4240 Oil | 10.0 | → | → | → | → | → | → | → | → | → |
| Zinc Oxide | 4.0 | → | → | → | → | → | → | → | → | → |
| Stearic Acid | 2.0 | → | → | → | → | → | → | → | → | → |
| Antidegradant | 2.0 | → | → | → | → | → | → | → | → | → |
| Batch Dump Temp., °C. (Probe) | 177 | 182 | 184 | 184 | 182 | 181 | 191 | 190 | 185 | 184 |
| Green Strength at Room Temp., MPa Stress at: | | | | | | | | | | |
| 100% | 0.43 | 0.47 | 0.46 | 0.41 | 0.41 | 0.45 | 0.64 | 0.68 | 0.52 | 0.51 |
| 300% | 0.50 | 1.04 | 1.19 | 0.50 | 0.47 | 0.30 | 0.75 | 0.90 | 0.29 | — |
| 400% | 0.61 | 1.45 | 1.64 | 0.58 | 0.56 | 0.26 | 0.68 | 0.83 | 0.10 | — |
| U.E., % | 800 | 590 | 510 | 800 | 780 | 380 | 490 | 390 | 350 | 250 |
| Tack, Monsanto Tel-Tack | | | | | | | | | | |
| Tack | 63 | 57 | 60 | 57 | 61 | 25 | 23 | 23 | 30 | 28 |
| Stickiness | 13 | 13 | 15 | 13 | 15 | 16 | 16 | 16 | 14 | 14 |
| "True" Tack | 50 | 44 | 45 | 44 | 46 | 9 | 7 | 7 | 16 | 14 |

The diene rubber of the invention has been shown to possess improved properties, especially improved green strength and tack. As a result of these improved properties, processing of the diene rubber is facilitated, and rubber objects such as tires, for example, which are fabricated from a plurality of components, can be produced with greater speed and with fewer defects. The improved diene rubber of the invention thus is useful for hose, belts, and a variety of other rubber products in addition to tires.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. The method of improving the properties of diene rubber comprising treating diene rubber by mastication with from 0.1 to 20 parts by weight per 100 parts diene rubber by weight of (B) a maleic acid half ester which is the product of the reaction of one mole of a mono- or poly-hydric alcohol of the formula $R(OH)_n$ with n moles or less of maleic acid or anhydride, where R is alkyl of 1-20 carbon atoms, cycloalkyl of 3-20 carbon atoms, aryl of 6-20 carbon atoms or aralkyl or alkaryl of 7-20 carbon atoms, optionally substituted with one or more non-reactive substituents selected from halogen, nitro and alkoxy or carboxy of 1-5 carbon atoms, and n is an integer of from 1-4 at an appropriate temperature above 130° C. for a time of from 0.1 to 20 minutes.

2. The method of claim 1 wherein the diene rubber is treated for a time sufficient to increase both its green strength and its tack.

3. The method of claim 1 wherein the treatment temperature is at least 150° C.

4. The method of claim 1 wherein R is selected from alkylphenyl and aliphatic hydrocarbon radicals of no more than eight carbon atoms.

5. The method of claim 3 wherein (A) sulfur or an organic sulfur compound capable of generating thiyl radicals is present in an amount of from 0.01-15 parts by weight per 100 parts diene rubber by weight.

6. The method of claim 5 wherein (A) comprises 2,2'-dithiobisbenzothiazole.

7. The method of claim 5 wherein the treatment time is from 0.5 to 15 minutes, the temperature is at least 160° C. and (A) and (B) are present in amounts of from 0.02-4 and 0.2-8 parts by weight, respectively, per 100 parts diene rubber by weight.

8. The method of claim 5 wherein the diene rubber comprises polyisoprene.

9. The method of claim 5 wherein (A) is 2,2'-dithiobisbenzothiazole.

10. The method of claim 5 wherein the time is from 1-10 minutes, the treatment temperature is from 160° to 210° C., and (A) and (B) are present in amounts of from 0.05-0.25 and 0.25-5 parts by weight, respectively, per 100 parts diene rubber by weight.

11. The method of claim 10 wherein the diene rubber comprises polyisoprene.

12. The method of claim 10 wherein (A) is sulfur.

13. The method of claim 10 wherein (A) is an organic sulfur compound capable of generating thiyl radicals.

14. The method of claim 13 wherein (A) is selected from polymeric polysulfides and compounds of the formula $(R_1S_x)yR_2$, wherein x is an integer of 1-5, y is an integer of from 1-4, $R_2$ is a radical selected from aliphatic hydrocarbon radicals of 3-18 carbon atoms optionally containing one or more ether or ester linkages and optionally substituted by one or more nitro, amino or carboxyl groups; cycloalkyl of 3-10 carbon atoms; benzyl or phenyl optionally ring-substituted by one or more nitro, amino, carboxyl, or 1-5 carbon-atom alkyl groups; or benzothiazyl; dialkylthiocarbamoyl; alkylamino of 4-12 carbon atoms; morpholino; or dialkylthiophosphoroyl; $R_2$ having a valence of y; and $R_1$ is hydrogen or a radical selected from the same group as $R_2$.

15. The method of claim 14 wherein (A) is 2,2' dithiobisbenzothiazole.

16. The method of claim 15 wherein the diene rubber comprises polyisoprene.

17. The method of claim 15 wherein carbon black is present.

18. The method of claim 15 wherein a non-black filler is present.

19. The method of claim 18 wherein the non-black filler is selected from clay, talc, calcium carbonate and silica.

20. The method of claim 15 wherein the diene rubber comprises natural rubber.

21. The method of claim 15 wherein the diene rubber includes polybutadiene or styrene/butadiene rubber.

22. The method of claim 16 and the additional step of incorporating from 10 to 100 parts by weight of diene rubber not present during the treatment.

23. The product of the method of claim 1.

24. The product of the method of claim 9.

25. The product of the method of claim 16.

* * * * *